US011139669B2

(12) United States Patent
Liu et al.

(10) Patent No.: US 11,139,669 B2
(45) Date of Patent: Oct. 5, 2021

(54) CONVERTER SYSTEM AND METHOD

(71) Applicant: DELTA ELECTRONICS, INC., Taoyuan (TW)

(72) Inventors: Yunfeng Liu, Taoyuan (TW); Guojin Xu, Taoyuan (TW); Guoqiao Shen, Taoyuan (TW); Jinfa Zhang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 359 days.

(21) Appl. No.: 16/379,412

(22) Filed: Apr. 9, 2019

(65) Prior Publication Data

US 2020/0021117 A1 Jan. 16, 2020

(30) Foreign Application Priority Data

Jul. 13, 2018 (CN) .......................... 201810770017.3

(51) Int. Cl.
*H02J 7/00* (2006.01)
*H02M 3/04* (2006.01)
*B61C 3/00* (2006.01)
*H02J 7/34* (2006.01)

(52) U.S. Cl.
CPC ............ *H02J 7/007* (2013.01); *H02J 7/0068* (2013.01); *H02M 3/04* (2013.01); *B61C 3/00* (2013.01); *H02J 7/345* (2013.01)

(58) Field of Classification Search
CPC ...................................................... H02J 7/007
See application file for complete search history.

(56) References Cited

U.S. PATENT DOCUMENTS

| 2005/0030779 | A1 | 2/2005 | Feng | |
| 2008/0003462 | A1 | 1/2008 | Aleyraz et al. | |
| 2017/0018959 | A1* | 1/2017 | Yu | H02J 9/061 |
| 2017/0063269 | A1* | 3/2017 | Miklosovic | G05B 13/02 |

FOREIGN PATENT DOCUMENTS

| CN | 201045747 Y | 4/2008 |
| CN | 201230276 Y | 4/2009 |
| CN | 202178711 U | 3/2012 |

(Continued)

*Primary Examiner* — Robert Grant
(74) *Attorney, Agent, or Firm* — Kirton McConkie; Evan R. Witt

(57) ABSTRACT

A converter system and method is provided. The converter system includes a converter and a control module. The converter is electrically connected with a DC bus and a load. The converter is configured to realize the conversion between a bus voltage of the DC bus and a load voltage of the load. The control module is electrically coupled with the converter. When the converter is in a standby mode, the control module generates a first-side compensation signal according to the bus voltage and generates a second-side compensation signal according to the load voltage. And the control module generates an instruction current signal according to the first-side compensation signal, the second-side compensation signal and a reference current signal. The control module generates the driving signal according to the instruction current signal, so as to control an output current of the converter to be stable.

20 Claims, 3 Drawing Sheets

(56) References Cited

FOREIGN PATENT DOCUMENTS

| CN | 103401420 | A | 11/2013 |
| CN | 104579120 | A | 4/2015 |
| CN | 105050853 | A | 11/2015 |
| CN | 104218658 | B | 8/2016 |
| CN | 107069695 | A | 8/2017 |
| CN | 107634541 | A | 1/2018 |

* cited by examiner

CONVERTER SYSTEM AND METHOD

CROSS-REFERENCE TO RELATED APPLICATION

This application claims priority to China Patent Application No. 201810770017.3, filed on Jul. 13, 2018, the entire content of which is incorporated herein by reference for all purposes.

FIELD OF THE DISCLOSURE

The present disclosure relates to a converter system and method, and more particularly to a converter system and method for controlling a converter during standby mode.

BACKGROUND OF THE DISCLOSURE

In Energy Storage System (ESS), a bidirectional DC/DC converter is utilized for realizing the energy exchange between a DC power grid and a load. For example, in the modern urban rail transit system, the non-isolated bidirectional DC/DC converter is used to rapidly regulate and control the energy flowing between the urban rail power grid and the energy storage system with super capacitors. When a train is retarded or braked, a large amount of energy is generated due to regenerative brake. Therefore, the generated energy can be stored in the super capacitor by the bidirectional converter, so as to avoid the excessive bus voltage. And when the train starts or speeds up, the needed energy can be provided by the super capacitor via the bidirectional converter, so as to prevent from pulling down the bus voltage.

However, in the modern urban rail transit system, the bidirectional converter mostly works in the standby mode except for the trains starting and stopping. During the standby mode, the bus voltage and the load voltage (e.g., the output voltage of the super capacitor) cannot keep constant after a certain time interval, due to the restriction of the inherent loss of the bidirectional converter and the sampling precision. Accordingly, the bus voltage and the load voltage can't be stable after a while, which causes power loss.

Therefore, there is a need of providing a converter system and method in order to overcome the above drawbacks.

SUMMARY OF THE DISCLOSURE

One aspect of the present disclosure is provided a converter system for controlling an output current of a bidirectional converter. The converter system includes a converter and a control module. The converter has a first side electrically connected with a DC bus and a second side electrically connected with a load. The converter is configured to realize the conversion between a bus voltage of the DC bus and a load voltage of the load. The control module is electrically coupled with the converter. The control module is configured to generate an instruction current signal according to a reference current signal and output a driving signal to the converter according to the instruction current signal. When the converter is in a standby mode, the control module is configured to generate a first-side compensation signal according to the bus voltage and a second-side compensation signal according to the load voltage so as to compensate an inherent current error of the converter, and control the output current of the converter to be stable by the first-side compensation signal and second-side compensation signal.

Another aspect of the present disclosure is provided a method for controlling an output current of a converter in a standby mode. The converter is electrically connected with a DC bus and a load. The method includes: providing a reference current signal; generating a first-side compensation signal according to a bus voltage, and generating a second-side compensation signal according to a load voltage; compensating an inherent current error of the converter according to the first-side compensation signal and the second-side compensation signal to generate an instruction current signal; and outputting a driving signal to the converter according to the instruction current signal so as to control the output current of the converter to be stable.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
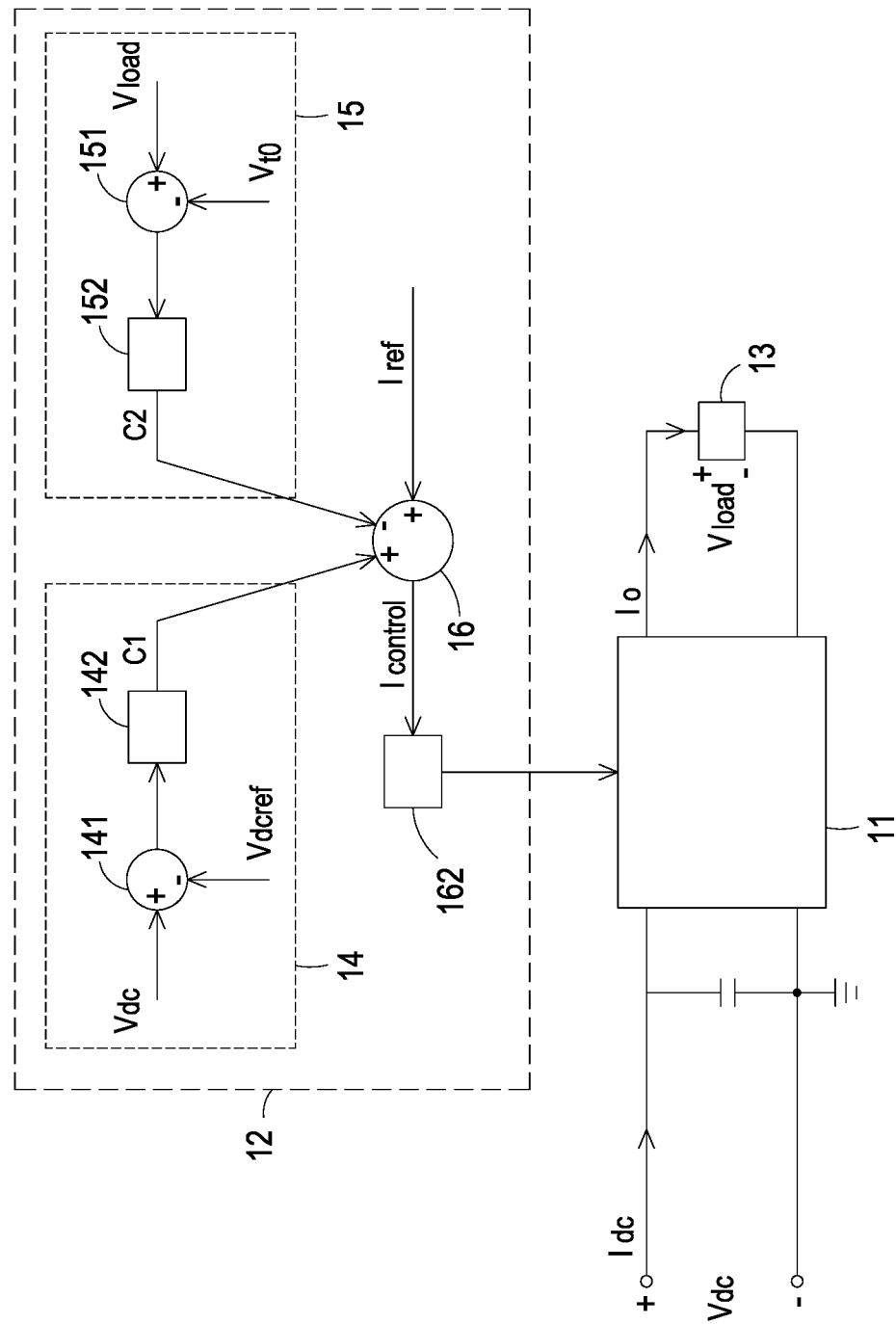
FIG. 1 is a schematic circuit diagram illustrating a converter system according to an embodiment of the present disclosure.

FIG. 1 is a schematic circuit diagram illustrating a converter system according to an embodiment of the present disclosure. As shown in FIG. 1, the converter system 1 is configured for controlling the output current of the bidirectional converter and includes a converter 11 and a control module 12. The converter 11 has a first side electrically connected with a DC bus and a second side electrically connected with a load 13. The converter 11 is configured to realize the conversion between a bus voltage $V_{dc}$ of the DC bus and a load voltage $V_{load}$ of the load 13. The control module 12 is electrically coupled with the converter 11 to control the operation of the converter 11. In an embodiment, the load 13 is for example but not limited to a super capacitor or a lithium battery.

In the prior art, the control module 12 sets a reference current signal $I_{ref}$, and detects the output current of the converter to compare with the reference current signal $I_{ref}$. The control module 12 generates the driving signal to control the output current of the converter according to the difference between the output current and the reference current signal $I_{ref}$. Ideally, when the converter 11 is in the standby mode, the reference current signal $I_{ref}$ is set to be zero, and correspondingly, the output current $I_o$ of the converter 11 can be controlled to be zero. However, in fact, due to the loss of the converter, the limited sampling precision and other reasons, the converter exists inherent current error. So the output current $I_o$ of the converter 11 cannot be maintained at zero in the standby mode, and the bus voltage $V_{dc}$ and the load voltage $V_{load}$ cannot be maintained stable correspondingly.

In the present disclosure, as shown in FIG. 1, the control module 12 is configured to generate an instruction current signal $I_{control}$ according to a reference current signal $I_{ref}$ and outputting a driving signal according to the instruction current signal $I_{control}$ to the converter 11, so as to control the operation of the converter 11. When the converter 11 is in a standby mode, the control module 12 generates a first-side compensation signal C1 and a second-side compensation signal C2 according to the bus voltage $V_{dc}$ and the load voltage $V_{load}$ respectively, so as to compensate the inherent current error of the converter. The control module 12 regulates the reference current signal $I_{ref}$ according to the first-side compensation signal C1 and the second-side compensation signal C2 to generate the instruction current signal $I_{control}$, and generates the driving signal according to the instruction current signal $I_{control}$. By the control of the first-side compensation signal C1 and the second-side compensation signal C2, the output current $I_o$ of the converter 11 is controlled to be zero, and the bus voltage $V_{dc}$ and the load voltage $V_{load}$ are kept stable substantially.

Further, in some embodiments, the instruction current signal $I_{control}$ compares with the output current to generates driving signal.

Therefore, as shown in FIG. 1, the control module 12 of the converter system 1 generates the first-side compensation signal C1 and the second-side compensation signal C2 to compensate the converter system, so as to eliminate the influence of the inherent current error. So the output current $I_o$ of the converter 11 may be controlled to be zero substantially in standby mode, and the bus voltage $V_{dc}$ and the load voltage $V_{load}$ can maintain stable. In addition, when the converter 11 charges or discharges the load 13 during the working mode, the converter 11 is under current loop control. The control module 12 generates the driving signal according to the output current $I_o$ and a preset reference current signal $I_{ref}$. With the converter system 1 of FIG. 1, the inner loop of the converter 11 can also be current loop control during the standby mode, and the driving signal is generated according to the output current $I_o$ and the instruction current signal $I_{control}$. So when the converter 11 is switched between the standby mode and the working mode, the dynamic response of the converter 11 with this method is very quick.

Figure 2:
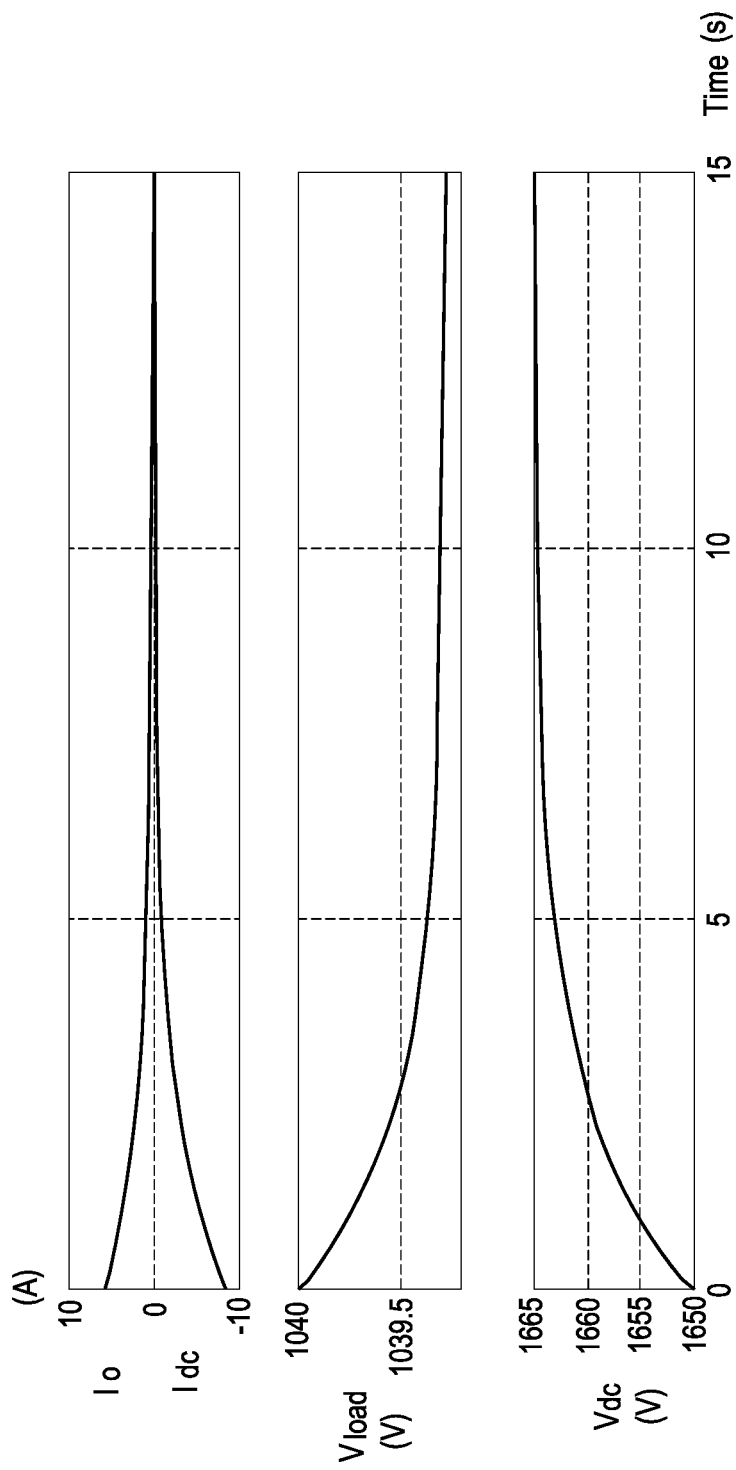
FIG. 2 is an exemplary graph showing the variation of a bus voltage, a load voltage, a bus current and an output current of the circuit diagram of FIG. 1.

FIG. 2 is an exemplary graph showing the variation of a bus voltage $V_{dc}$, a load voltage $V_{load}$, a bus current $I_{dc}$ and an output current $I_o$ of the circuit diagram of FIG. 1. As shown in FIG. 2, for example, due to the influence of the current error, at time t=0 s, the output current $I_o$ of the converter 11 is not equal to zero and the bus current $I_{dc}$ also deviates from zero, and the deviation of current is almost 9 A. Correspondingly, the bus voltage $V_{dc}$ and the load voltage $V_{load}$ are away from stable value. Then the deviation of current is compensated and controlled by the converter system 1 of FIG. 1, and the output current $I_o$ of the converter 11 is controlled to become zero gradually. Accordingly, the bus current $I_{dc}$ approaches and equals zero finally, and the bus voltage $V_{dc}$ and the load voltage $V_{load}$ become stable and are kept at a certain value at last.

Referring to FIG. 1, in an embodiment, the relations among the instruction current signal $I_{control}$, the reference current signal $I_{ref}$, the first-side compensation signal C1 and the second-side compensation signal C2 conform to the equation (1).

$$I_{control}=I_{ref}+C1-C2 \qquad (1)$$

When the converter 11 is in the standby mode, the reference current signal $I_{ref}$ is set to be zero. In order to make the output current of the converter 11 equal to zero, the first-side compensation signal C1 and the second-side compensation signal C2 is configured to compensate the inherent current error to conform to the equation (2), $$I_{error}=C2-C1 \qquad (2)$$

where $I_{error}$ is the inherent current error. The current error may be caused by the loss of the bidirectional converter and the limited sampling precision and other reasons.

In an embodiment, the control module 12 includes a first-side compensation unit 14, and the first-side compensation unit 14 includes a first calculator 141 and a first regulator 142. The first calculator 141 receives a reference bus voltage $V_{dcref}$ and the real-time bus voltage $V_{dc}$ and outputs a difference therebetween to the first regulator 142. The first regulator 142 outputs the first-side compensation signal C1. The reference bus voltage $V_{dcref}$ is a voltage value that the bus voltage $V_{dc}$ needs to be maintained. In some embodiments, the control module 12 may have sampling unit to sample the real-time bus voltage $V_{dc}$ of the DC bus. In some embodiments, the first regulator 142 is a proportional (P) controller. As shown in the equation (3), the first-side compensation signal C1 is equal to the product of a first coefficient and the difference between the reference bus voltage $V_{dcref}$ and the bus voltage $V_{dc}$, $$C1=A*(V_{dc}-V_{dcref}) \qquad (3)$$

where A is the first coefficient and is adjustable in accordance with the current error.

In an embodiment, the control module 12 includes a second-side compensation unit 15, and the second-side compensation unit 15 includes a second calculator 151 and a second regulator 152. The second calculator 151 receives an initial load voltage $V_{r0}$ and the real-time load voltage $V_{load}$ and outputs a difference therebetween to the second regulator 152. The second regulator 152 outputs the second-side compensation signal C2. The initial load voltage $V_{r0}$ is the value of the load voltage when the reference current signal $I_{ref}$ is set to be zero. In some embodiments, the control module 12 may have sampling unit to sample the real-time load voltage $V_{load}$ of the load. In some embodiments, the second regulator 152 is a proportional integral (PI) controller. In an embodiment, as shown in the equation (4), the second-side compensation signal C2 is equal to the product of a second coefficient and the difference between the initial load voltage $V_{r0}$ and the load voltage $V_{load}$ and, $$C2=B*(V_{load}-V_{r0}) \qquad (4)$$

Where B is the second coefficient and is adjustable in accordance with the current error.

In an embodiment, the control module 12 includes a third calculator 16. The third calculator 16 receives the reference current signal $I_{ref}$, the first-side compensation signal C1 and the second-side compensation signal C2, and outputs the instruction current signal $I_{control}$. Wherein, when the converter 11 is in the standby mode, the reference current signal $I_{ref}$ is set to be zero. Further, the control module 12 includes a current regulating unit 162, and the current regulating unit 162 receives the instruction current signal $I_{control}$ and outputs a driving signal to control the operation of the converter 11. In some embodiments, the current regulating unit 162 also receives the output current $I_o$, and output the driving signal according to the difference between the instruction current signal $I_{control}$ and the output current $I_o$.

Figure 3:
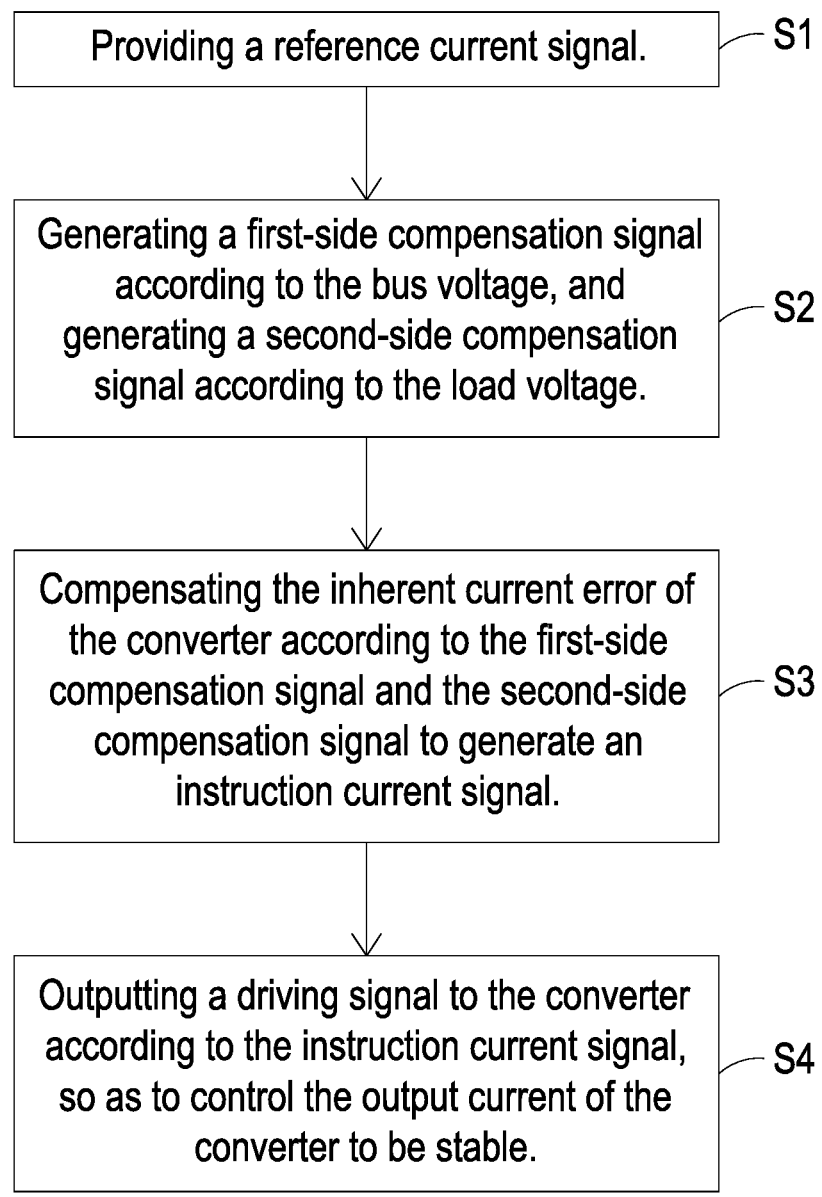
FIG. 3 is a flowchart illustrating a control method according to an embodiment of the present disclosure.

FIG. 3 is a flowchart illustrating a control method according to an embodiment of the present disclosure. The control method is applied to the converter system 1 of FIG. 1. The control method includes the following steps.

Firstly, providing a reference current signal $I_{ref}$ (Step S1). In some embodiments, when the converter 11 is in the standby mode, the reference current signal $I_{ref}$ is set to be zero.

Then, generating a first-side compensation signal C1 according to the bus voltage, and generating a second-side compensation signal C2 according to the load voltage (Step S2). In an embodiment, the first-side compensation signal C1 is generated according to the difference between the reference bus voltage $V_{dcref}$ and the real-time bus voltage $V_{dc}$, and the second-side compensation signal C2 is generated according to the difference between the initial load voltage $V_{r0}$ and the real-time load voltage $V_{load}$. In an embodiment, the first-side compensation signal C1 is equal to the product of the first coefficient A and the difference between the reference bus voltage $V_{dcref}$ and the real-time bus voltage $V_{dc}$. In an embodiment, the second-side compensation signal C2 is equal to the product of the second coefficient B and the difference between the initial load voltage $V_{r0}$ and the real-time load voltage $V_{load}$. The first coefficient A and the second coefficient B can be adjusted in accordance with the current error.

Then, compensating the inherent current error of the converter according to the first-side compensation signal C1 and the second-side compensation signal C2 to generate an instruction current signal $I_{control}$ (Step S3). In an embodiment, the relations among the reference current signal $I_{ref}$, the instruction current signal $I_{control}$, the first-side compensation signal C1 and the second-side compensation signal C2 conform to the equation (1) described above. In addition, in order to make the output current $I_o$ of the converter 11 equal to zero, the first-side compensation signal C1 and the second-side compensation signal C2 are configured to conform to the equation (2) described above.

Finally, outputting a driving signal to the converter 11 according to the instruction current signal $I_{control}$, so as to control the output current $I_o$ of the converter 11 to be stable (Step S4).

From the above descriptions, the present disclosure provides a converter system and method for a converter connected with a DC bus and a load. When the converter is in a standby mode, a first-side compensation signal and a second-side compensation signal are generated according to the bus voltage and the load voltage respectively. The first-side compensation signal and the second-side compensation signal regulate the reference current signal of the converter to compensate the inherent current error of the converter. By the converter system and method, the output current of the converter is controlled substantially to be zero in standby mode, and thus the bus voltage and the load voltage are kept stable and the power loss is avoided. In addition, when the converter is in a working mode, the converter charges or discharges the load under current loop control. By the converter system and method, the inner loop of the converter is also under current loop control in the standby mode. So when the converter is switched between the standby mode and the working mode, the converter system and method makes quickly dynamic response.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A converter system for controlling an output current of a bidirectional converter, comprising:
    a converter having a first side electrically connected with a DC bus and a second side electrically connected with a load, wherein the converter is configured to realize the conversion between a bus voltage of the DC bus and a load voltage of the load; and
    a control module electrically coupled with the converter, wherein the control module is configured to generate an instruction current signal according to a reference current signal, and configured to output a driving signal to the converter according to the instruction current signal;
    wherein when the converter is in a standby mode, the control module is configured to generate a first-side compensation signal according to the bus voltage and a second-side compensation signal according to the load voltage so as to compensate an inherent current error of the converter, and control the output current of the converter to be stable by the first-side compensation signal and the second-side compensation signal.

2. The converter system according to claim 1, wherein the reference current signal is set to be zero in the standby mode.

3. The converter system according to claim 1, wherein the output current of the converter is substantially controlled to be zero by the control module in the standby mode.

4. The converter system according to claim 1, wherein the first side and the second side are an input side and an output side respectively, or the first side and the second side are an output side and an input side respectively.

5. The converter system according to claim 1, wherein the control module comprises a first-side compensation unit, which is configured to receive a reference bus voltage and a real-time bus voltage, and output the first-side compensation signal according to the reference bus voltage and the real-time bus voltage.

6. The converter system according to claim 5, wherein the first-side compensation unit comprises a first calculator and a first regulator, and the first calculator receives the reference bus voltage and the real-time bus voltage and outputs a difference therebetween to the first regulator, and the first regulator outputs the first-side compensation signal.

7. The converter system according to claim 6, wherein the first regulator is a proportional controller.

8. The converter system according to claim 1, wherein the control module comprises a second-side compensation unit, and the second-side compensation unit outputs the second-side compensation signal according to an initial load voltage and a real-time load voltage.

9. The converter system according to claim 8, wherein the second-side compensation unit comprises a second calculator and a second regulator, and the second calculator receives the initial load voltage and the real-time load voltage and outputs a difference therebetween to the second regulator, and the second regulator outputs the second-side compensation signal.

10. The converter system according to claim 9, wherein the second regulator is a proportional integral (PI) controller.

11. The converter system according to claim 8, wherein the initial load voltage is the value of the load voltage when the reference current signal is set to be zero.

12. The converter system according to claim 1, wherein the instruction current signal, the reference current signal, the first-side compensation signal and the second-side compensation signal conform to the following equation, $$I_{control}=I_{ref}+C1-C2$$

where $I_{control}$ is the instruction current signal, $I_{ref}$ is the reference current signal, C1 is the first-side compensation signal and C2 is the second-side compensation signal.

13. The converter system according to claim 12, wherein when the converter is in the standby mode, the reference current signal is set to be zero, and the inherent current error, the first-side compensation signal and the second-side compensation signal conform to the following equation so as to make the output current of the converter substantially to be zero, $$I_{error}=C2-C1$$

wherein $I_{error}$ is the inherent current error of the converter.

14. The converter system according to claim 12, wherein the control module comprises a third calculator, which is configured to output the instruction current signal according to the reference current signal, the first-side compensation signal and the second-side compensation signal.

15. The converter system according to claim 1, wherein the load is a super capacitor or a lithium battery.

16. A method for controlling an output current of a converter in a standby mode, wherein the converter is electrically connected with a DC bus and a load, the method comprising:

providing a reference current signal;

generating a first-side compensation signal according to a bus voltage, and generating a second-side compensation signal according to a load voltage;

compensating an inherent current error of the converter according to the first-side compensation signal and the second-side compensation signal to generate an instruction current signal; and outputting a driving signal to the converter according to the instruction current signal so as to control the output current of the converter to be stable.

17. The method according to claim 16, wherein the first-side compensation signal is generated according to a reference bus voltage and a real-time bus voltage, and the second-side compensation signal is generated according to an initial load voltage and a real-time load voltage.

18. The method according to claim 16, wherein the instruction current signal, the reference current signal, the first-side compensation signal and the second-side compensation signal conform to the following equation, $$I_{control}=I_{ref}+C1-C2$$

where $I_{control}$ is the instruction current signal, $I_{ref}$ is the reference current signal, C1 is the first-side compensation signal and C2 is the second-side compensation signal.

19. The method according to claim 18, wherein when the converter is in the standby mode, the reference current signal is set to be zero, and the current error signal, the input-side compensation signal and the output-side compensation signal conform to the following equation so as to make the output current of the converter substantially to be zero, $$I_{error}=C2-C1$$

wherein $I_{error}$ is the inherent current error of the converter.

20. The method according to claim 16, wherein the load is a super capacitor or a lithium battery.

* * * * *